US012774629B2

(12) United States Patent
Peng et al.

(10) Patent No.: US 12,774,629 B2
(45) Date of Patent: *Oct. 27, 2026

(54) DOOR OPENING AND CLOSING DEVICE AND ELECTRICAL APPARATUS

(71) Applicants: HEFEI MIDEA REFRIGERATOR CO., LTD., Hefei (CN); HEFEI HUALING CO., LTD., Hefei (CN); MIDEA GROUP CO., LTD., Foshan (CN)

(72) Inventors: Bo Peng, Hefei (CN); Xiuliang Fu, Hefei (CN); Jinguo Yuan, Hefei (CN); Shuo Yang, Hefei (CN); Yerui Feng, Hefei (CN); Bing Shi, Hefei (CN); Zhuohua Jiang, Hefei (CN); Yafei Zhu, Hefei (CN)

(73) Assignees: HEFEI MIDEA REFRIGERATOR CO., LTD., Hefei (CN); HEFEI HUALING CO., LTD., Hefei (CN); MIDEA GROUP CO., LTD., Foshan (CN)

( * ) Notice: Subject to any disclaimer, the term of this patent is extended or adjusted under 35 U.S.C. 154(b) by 168 days.

This patent is subject to a terminal disclaimer.

(21) Appl. No.: 18/855,330

(22) PCT Filed: Jun. 28, 2022

(86) PCT No.: PCT/CN2022/101708

§ 371 (c)(1),
(2) Date: Oct. 9, 2024

(87) PCT Pub. No.: WO2023/151220

PCT Pub. Date: Aug. 17, 2023

(65) Prior Publication Data

US 2025/0237104 A1 Jul. 24, 2025

(30) Foreign Application Priority Data

Feb. 14, 2022 (CN) ........................ 202210134092.7

(51) Int. Cl.
*E05F 15/63* (2015.01)

(52) U.S. Cl.
CPC ......... *E05F 15/63* (2015.01); *E05Y 2201/712* (2013.01); *E05Y 2900/31* (2013.01)

(58) Field of Classification Search
CPC ........ F25D 23/028; E05F 15/00; E05F 15/63; E05F 15/70; E05F 15/614; E05Y 2900/30;
(Continued)

(56) References Cited

U.S. PATENT DOCUMENTS 6,338,536 B1 * 1/2002 Ueno .................. E05B 17/0033 49/478.1
10,301,865 B2 * 5/2019 Son ....................... E05F 15/614
(Continued)

FOREIGN PATENT DOCUMENTS

CN 208332837 U 1/2019
CN 109556345 A 4/2019
(Continued)

OTHER PUBLICATIONS

The First Notification of Examination Opinion received in the counterpart CN application 2022101340927, mailed on Apr. 9, 2025, 15 pages with English translation.
(Continued)

*Primary Examiner* — James O Hansen
(74) *Attorney, Agent, or Firm* — K&L Gates LLP

(57) ABSTRACT

The disclosure discloses a door opening and closing device and an electrical apparatus, and belongs to a field of electrical apparatus. The door opening and closing device includes a door ejection mechanism and a door rotation mechanism driven by a same drive mechanism; the door rotation mechanism includes a drive member and a door rotation member; a first end of the door rotation member is
(Continued)

rotatably disposed on a door body; a second end of the door rotation member is rotatably connected to a first end of the drive member; a second end of the drive member is rotatably disposed on a base; the drive mechanism includes a linkage gear; the linkage gear can drive the drive member to rotate to drive the door rotation member to rotate the door body, and drive the door ejection mechanism to eject and push the door body.

18 Claims, 16 Drawing Sheets

(58) Field of Classification Search
CPC ........... E05Y 2900/31; E05Y 2900/304; E05Y 2201/712
USPC .......................................................... 312/405
See application file for complete search history.

(56) References Cited

U.S. PATENT DOCUMENTS

| | | | | |
|---|---|---|---|---|
| 10,961,762 | B1 * | 3/2021 | Botu | F25D 23/028 |
| 2019/0301228 | A1 * | 10/2019 | Yao | E05F 15/619 |

FOREIGN PATENT DOCUMENTS

| | | | |
|---|---|---|---|
| CN | 210832718 | U | 6/2020 |
| CN | 111503981 | A | 8/2020 |
| CN | 111721057 | A | 9/2020 |
| CN | 112212595 | A | 1/2021 |
| CN | 113958222 | A | 1/2022 |
| CN | 215571542 | U | 1/2022 |
| WO | 2017201843 | A1 | 11/2017 |

OTHER PUBLICATIONS

The First Notification of Examination Opinion received in the counterpart CN application 2022101341192, mailed on Apr. 11, 2025, 21 pages with English translation.
The Second Notification of Examination Opinion received in the counterpart CN application 2022101341192, mailed on Aug. 4, 2025, 22 pages with English translation.
The First Notification of Examination Opinion received in the counterpart CN application 2022101353876, mailed on Apr. 11, 2025, 16 pages with English translation.
The First Notification of Examination Opinion received in the counterpart CN application 2022101354012, mailed on Apr. 10, 2025, 16 pages with English translation.
The First Notification of Examination Opinion received in the counterpart CN application 2022101355015, mailed on Apr. 11, 2025, 24 pages with English translation.
The First Notification of Examination Opinion received in the counterpart CN application 2022101511564, mailed on Apr. 11, 2025, 18 pages with English translation.
ISR Received in PCT /CN2022/101708; mailed Nov. 16, 2022.

* cited by examiner

DOOR OPENING AND CLOSING DEVICE AND ELECTRICAL APPARATUS

CROSS-REFERENCES TO RELATED APPLICATIONS

The present disclosure is a national phase application of International Application No. PCT/CN2022/101708, filed on Jun. 28, 2024, which claims priority to the Chinese patent application No. 202210134092.7, filed on Feb. 14, 2022, which is incorporated herein by reference in its entirety.

FIELD

The disclosure relates to a field of electrical technology, and particularly to a door opening and closing device and an electrical apparatus.

BACKGROUND

With an improvement of living standards, electrical apparatuses such as refrigerators, dishwashers, and disinfection cabinets have become widely used in lives of people. In order to maintain a sealing performance of the above electrical apparatuses, an adsorption structure is usually disposed between a box body and a door body of the electrical apparatuses, or a negative pressure is maintained inside relative to outside of the electrical apparatuses to stably fix the door body onto the box body. Although the electrical apparatuses have an improved sealing performance, a difficulty of opening a door body has also been increased to an extent. It usually requires a greater force to open the door body, which is inconvenient to use.

SUMMARY

A door opening and closing device and an electrical apparatus are provided according to the disclosure, aiming to achieve an effect of improving a convenience and safety of opening a door of an electrical apparatus to a certain extent.

A door opening and closing device is provided according to embodiments of the disclosure, including: a door ejection mechanism and a door rotation mechanism driven by a same drive mechanism; the door rotation mechanism includes a drive member and a door rotation member; a first end of the door rotation member is rotatably disposed on a door body, and a second end of the door rotation member is rotatably connected to a first end of the drive member, and a second end of the drive member is rotatably disposed on the base; the drive mechanism includes a linkage gear; the linkage gear drives the drive member to rotate to drive the door rotation member to rotate the door body, and drive the door ejection mechanism to eject and push the door body.

An electrical apparatus is provided according to another embodiment of the disclosure, including a box body, a door rotatably disposed on the box body, and the above door opening and closing device. The base is disposed on the box body.

ILLUSTRATION OF REFERENCE NUMERALS

100, drive mechanism; 110, driver; 120, linkage gear; 121, third tooth portion; 122, third ejection-push portion; 1221, second tooth portion; 123, rotation limit groove; 1231, first ejection-push portion; 1232, second ejection-push portion; 124, reset-spring accommodation groove; 125, second fix seat;

200, door rotation mechanism; 210, drive member; 211, coaxial rotation shaft; 212, first fix seat; 213, extension limit portion; 214, pivot shaft; 220, door rotation member; 221, first end of the door rotation member; 230, hinge seat; 240, reset spring;

300, door ejection mechanism; 310, linkage member; 311, linkage-member pivot hole; 312, thickness reduction groove; 313, first tooth portion; 314, third fix seat; 320, door ejection member; 322, waist-shaped hole; 330, ejection-push seat; 340, shock-absorb pad; 350, linkage-member pivot shaft; 360, pin shaft; 370, elastic limit member; 380, door ejection profile; 381, fourth tooth portion; 382, door ejection portion; 383, reinforcement rib;

600, base; 610, drive-motor fix groove; 620, second stop member; 621, stop surface; 630, first stop member; 631, elastic-member accommodation groove; 632, guide groove; 633, linkage-member first stop surface; 634, linkage-member second stop surface; 635, fourth fix seat; 641, third stop member; 642, fourth stop member; 650, coaxial rotation-shaft seat; 910, box body; 920, door body.

DETAILED DESCRIPTION OF THE DISCLOSURE

The disclosure provides a door opening and closing device, to improve an efficiency and convenience of door opening and closing operations to a certain extent, and at the same time to a certain extent solve problems of large resistance in an initial stage and too fast rotation in a subsequent stage of manually opening the refrigerator door, and unsmooth door opening and closing process.

A door opening and closing device according to some embodiments of the disclosure is configured to be assembled on an electrical apparatus with a door body that is deflectable to be opened and closed. The door body is driven to be open and closed through an action of the door opening and closing device. The electrical apparatus may be refrigerators, disinfection cabinets, dishwashers and so on.

Figure 1:
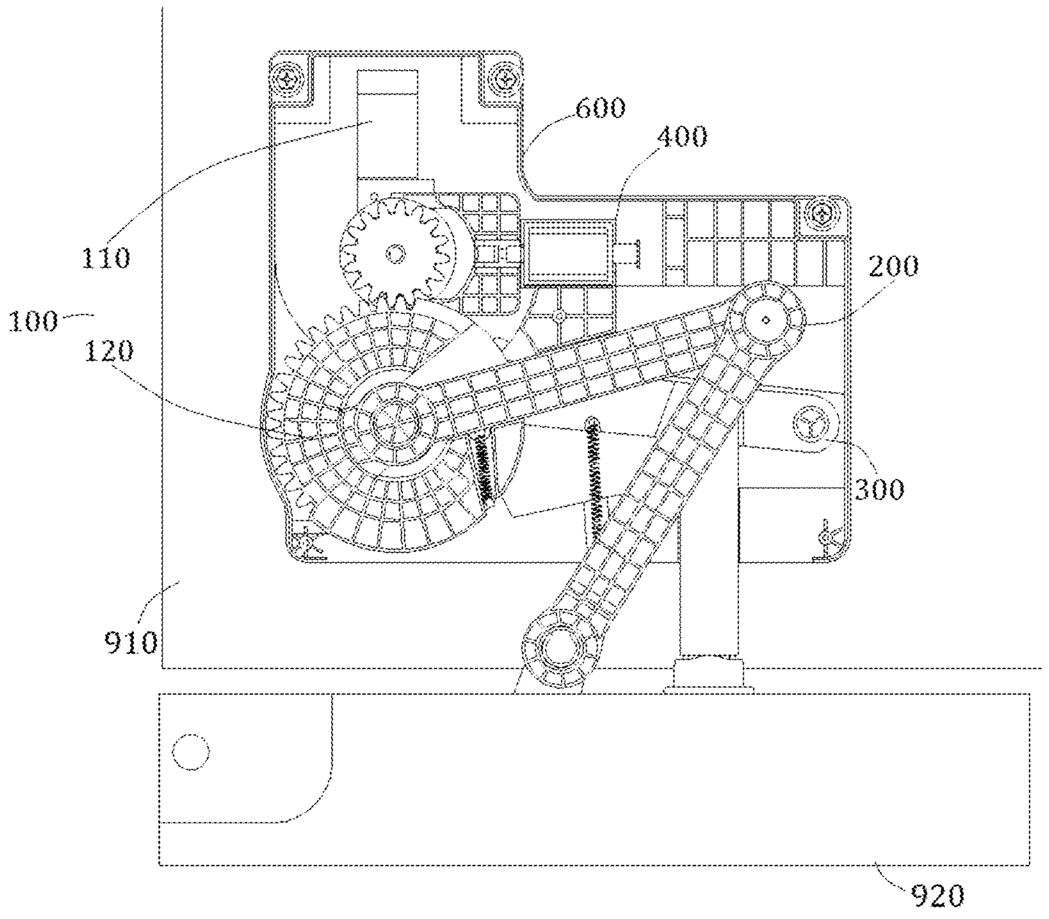
FIG. 1 shows a schematic structural diagram of a door opening and closing device according to one or more embodiments of the disclosure.

Referring to FIG. 1, in some embodiments, the electrical apparatus includes a box body 910 and a door body 920 which is rotatably disposed on the box body 910. An access opening is disposed on the box body 910. The door body 920 is operated to rotate on the box body 910 to close or open the access opening of the box body 910.

Referring to FIG. 1, in some embodiments, the door opening and closing device may include: a drive mechanism 100, a door rotation mechanism 200, and a door ejection mechanism 300. In some embodiments, the drive mechanism 100 outputs a driving force, which can drive the door rotation mechanism 200 and the door ejection mechanism 300 to implement a full rotation operation and an initial door ejection operation of the door body 920; that is, the door rotation mechanism 200 and the door ejection mechanism 300 according to the embodiments of the disclosure are both driven by the drive mechanism 100, and the driving forces for the door rotation mechanism 200 and the door ejection mechanism 300 are both provided by the drive mechanism 100.

Referring to FIG. 1, in some embodiments, in order to meet an assembly accuracy requirement or achieve an efficient assembly, a separate base 600 may be disposed on the box body 910 to carry the drive mechanism 100, the door rotation mechanism 200 and the door ejection mechanism 300, and the drive mechanism 100, the door rotation mechanism 200 and the door ejection mechanism 300 can be assembled on the base 600, and then the base 600 is assembled as a whole on the box body 910, to realize a standardized installation based on the base 600 on the electrical apparatus, to ensure a placement stability while ensuring a matching accuracy and reliability. On the other hand, when the base 600 is assembled as a whole on electrical apparatus such as refrigerators, it is efficient and reliable due to that the base 600 can be installed as a whole.

In some embodiments, the base 600 is a separate component disposed in the box body 910. In other embodiments, the base 600 may also be a portion of the box body 910, and be formed on the box body 910, rather than a separate component.

In some embodiments, the drive mechanism 100 outputs a driving force to respectively drive the door rotation mechanism 200 and the door ejection mechanism 300 to rotate relative to the base 600, to rotate the door body 920, and ejecting and pushing the door body 920. In some embodiments, when the door is opened automatically, the door body 920 is first ejected and pushed by driving the door ejection mechanism 300 until an adsorption force of the door body 920 is broken through, and the door body 920 is ejected and opened to an angle, and then the door body 920 is continued to rotate by the door rotation mechanism 200, thereby being capable of achieving a coordinated, stable, smooth, and efficient automatic door opening operation. When the door is closed, the drive mechanism 100 first drives the door rotation mechanism 200 to pull the door body 920 to deflect toward the box body 910 until the door body 920 is closed. During the door body 920 is closing, the drive mechanism 100 at the same time drives the door ejection mechanism 300 to be reset.

In some embodiments, in a condition that an output power remains unchanged, an output force is inversely proportional to a speed. Therefore, in a condition that a driving power remains unchanged, a larger ejecting and pushing force can be obtained at a lower deflection speed for the door body 920 in a door-ejecting stage, and the door ejection mechanism 300 can quickly and reliably eject and push the door body 920 to open. When the door rotation mechanism 200 is put into use, since a rotational resistance is very small, a higher door-rotation speed can be obtained in a condition that a smaller door-rotation force can be maintained, to complete a door-rotation operation and achieving door-opening in place.

In some embodiments, the door rotation mechanism 200 or the door ejection mechanism 300 can be respectively configured to cooperate with the drive mechanism 100 to independently implement a door opening and closing structure solution or a door ejection structure solution. In other embodiments, the door ejection mechanism 300 cooperates with the drive mechanism 100 to break through door opening resistances such as an adsorption resistance, a negative pressure and so on between the door body 920 and the box body 910, to eject and open the door body 920 to a preset angle to facilitate subsequent automatic or manual door-opening operations.

Referring to FIG. 1, in some embodiments, the drive mechanism 100 includes a linkage gear 120 rotatably disposed on the base 600. The linkage gear 120 can serve as an output portion of the drive mechanism 100. In other embodiments, the drive mechanism 100 further includes a driver 110 disposed on the base 600, which is connected to the linkage gear 120 via a connecting member or a transmission member to output a driving force.

In some embodiments, the driver 110 may be configured as a reduction motor, or a motor equipped with a reduction gearbox, and an output torque and rotation speed can be properly controlled.

Figure 4:
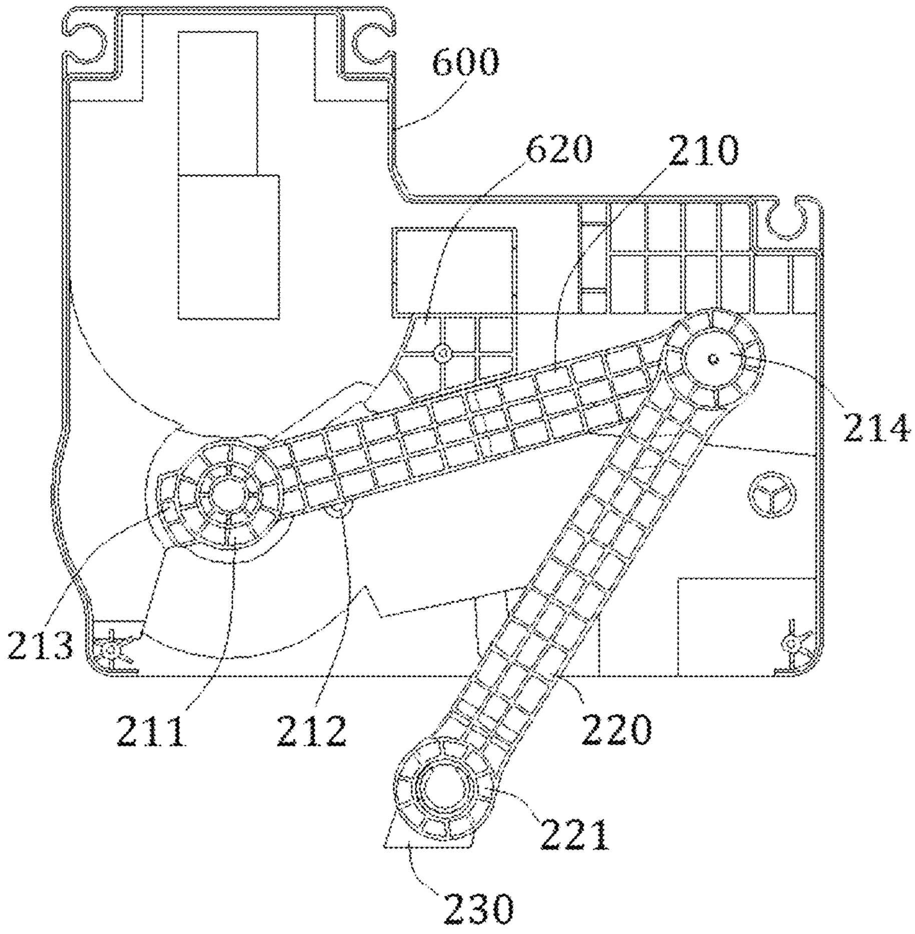
FIG. 4 is a schematic structural diagram of a door rotation mechanism of the door opening and closing device in FIG. 1.

Referring to FIG. 1 and FIG. 4, in some embodiments, the door rotation mechanism 200 includes a drive member 210 and a door rotation member 220 that are rotatably connected to each other. The drive member 210 is connected to the drive mechanism 100, and acts under the driving of the drive mechanism 100 to obtain a driving force. The door rotation member 220 is connected between the door body 920 and the drive member 210. The door rotation member 220, under the driving of the drive member 210, pushes and pulls the door body 920, to deflect the door body 920 relative to the box body 910 to realize the door opening and closing operations.

In order to adapt to a large deflection amplitude of the door body 920 and ensure that an efficiency and amplitude of door-rotation movement can meet door opening and closing requirements, a first end of the door rotation member 220 can be rotatably disposed at the door body 920; a second end of the door rotation member 220 is pivotally connected to a first end of the drive member 210; and a second end of the drive member 210 is rotatably disposed on the base 600, to form a two-stage rotation linkage push-pull structure, and a pushing-pulling action and a deflection action for the door rotation member 220 can be realized by driving the drive member 210 to rotate. Requirements of application of push force and pull force on the door body 920 through a fixed point can be respectively met, and state changes of a large-angle deflection of the door body 920 during a door opening and closing process can be matched and adapted, to ensure a stability and reliability of door pushing and pulling operations and the door-opening-closing operations for the door rotation mechanism 200. The drive mechanism 100 drives the drive member 210 and the door ejection mechanism 300 respectively by providing the linkage gear 120, and a simplified transmission structure is obtained and a coordinated control of a door-rotation operation and door-ejection operation are ensured.

Referring to FIG. 4, in some embodiments, a hinge seat 230 may be disposed on the door body 920, and hinged to the door-rotation-member first end 221. In order to ensure a hinge reliability and force uniformity, the hinge seat 230 may be configured as a U-shaped double-arm hinge seat, and the door-rotation-member first end 221 is embedded in the hinge seat 230 and fixed by a hinge shaft.

Figure 5:
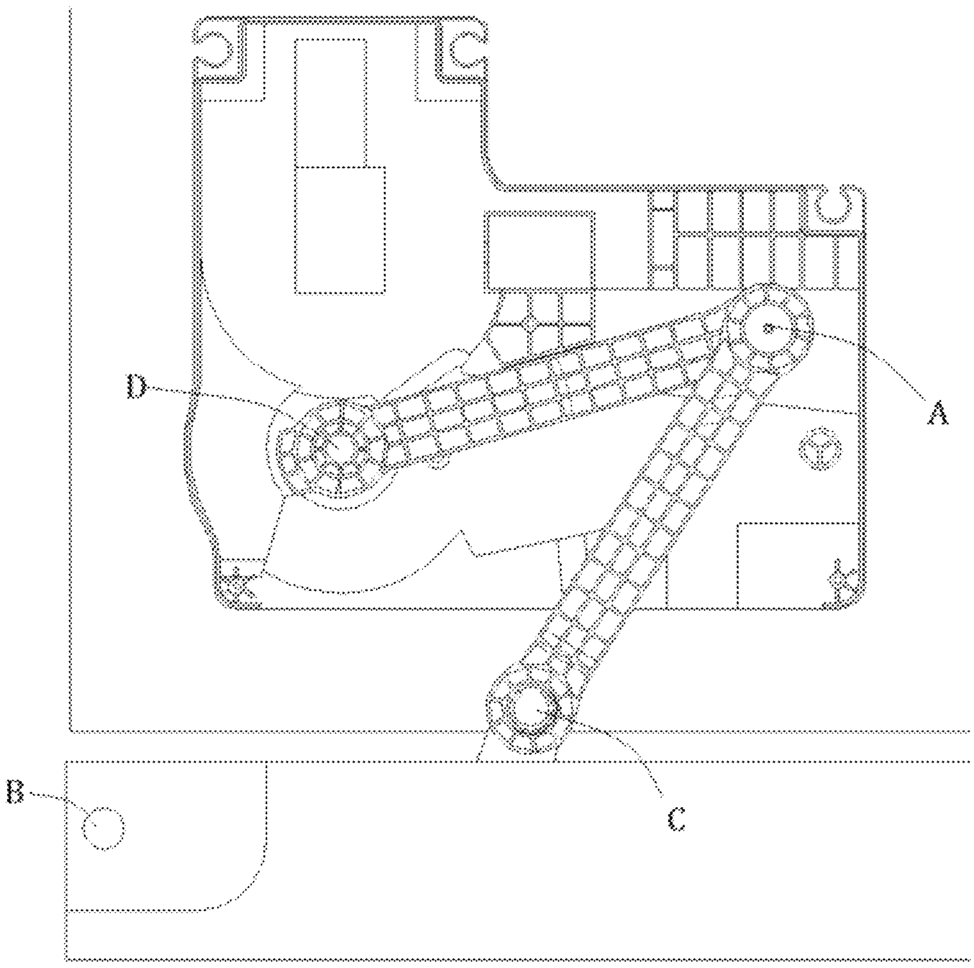
FIG. 5 is a schematic diagram for an arrangement position of the door rotation mechanism of the door opening and closing device in FIG. 1.

Referring to FIG. 5, in some embodiments, in order to ensure a door rotation efficiency and structural stability of the door rotation mechanism 200 and reduce an influence of a relative deflection state and extension length of the drive member 210 and the door rotation member 220 on an opening degree and door-rotation speed of the door body 920, the door rotation mechanism 200 and a hinge point C of the door rotation mechanism 200 and the door body 920 can be planned and arranged in combination with a rotation center B of the door body 920 of the electrical apparatus and a layout position of the base 600. The hinge point C between an end of the door rotation member 220 and the door body 920, a hinge point A between the drive member 210 and an end of the door rotation member 220, and a hinge point D through which another end of the drive member 210 is rotatably disposed on the base 600, can be designed in a distribution state, that is, the hinge point A and the rotation center B are respectively located at two sides of a connection line between the hinge point C and the hinge point D, and thus a convex quadrilateral is formed by connecting hinge points A, B, C and D in sequence, to avoid the drive member 210 and the door rotation member 220 from forming a deflection of more than 180 degrees during a rotation process. The deflection of more than 180 degrees may result in an extreme state that there is no force that can be acted on the door rotation member 220, and thus the door rotation member 220 is unable to rotate the door body 920, and a range of opening degree of the door body 920 is also limited.

In some embodiments, in order to maximize an opening angle of the door body 920 and the box body 910 themselves without being overly restricted by the door rotation mechanism 200, a position of the hinge point C between an end of the door rotation member 220 and the door body 920, a position of the hinge point D between another end of the drive member 210 and the base 600, and a length of two hinge points of the drive member 210 and the door rotation member 220 may be set according to a principle that a quadrangle formed by connecting the hinge point A, the hinge point C, the rotation center B and the hinge point D in sequence is a parallelogram. In this state, regardless of factors such as a width and thickness of structural components such as a revolving shaft and a hinge, the opening degree of the door body 920 can be close to 180 degrees. In some embodiments, the opening degree of the door body 920 of a refrigerator is not the bigger the better, but it is determined based on multiple factors such as installation conditions, usage requirements, convenience and so on. In other embodiments, with the above arrangement, the opening degree of 130 degrees can be stably and reliably achieved for the door body 920.

Referring to FIG. 4, FIG. 9, FIG. 10 and FIG. 11, in some embodiments, the linkage gear 120 is configured as a component to directly drive the drive member 210 and the door ejection mechanism 300, and thus the linkage gear 120 should be able to simultaneously drives the drive member 210 and the door ejection mechanism 300. A body of the linkage gear 120 may be configured as a rotation member at the base 600, and is provided with a third tooth portion 121 meshing with a upstream driver 110, to drive the door ejection mechanism 300 and the drive member 210 in a way of outputting torque through rotation. In order to meet a driving demand of the drive member 210, a first ejection-push portion 1231 and a second ejection-push portion 1232 may be disposed oppositely at the body, and a space enough to accommodate the drive member 210 is kept between the first ejection-push portion 1231 and the second ejection-push portion 1232. Therefore, in an actual assembly state, the drive member 210 can, respectively by the first ejection-push portion 1231 and the second ejection-push portion 1232, be ejected and pushed to rotate at two sides of the moving member 210. Therefore, when the body of the linkage gear 120 rotates in a forward direction and a reverse direction, the drive member 210 is ejected and pushed to rotate in two opposite directions respectively, to drive the door rotation member 220 to eject and push, or pull the door body 920 to realize the door opening and closing operations.

Referring to FIG. 4, FIG. 9, FIG. 10 and FIG. 11, in some embodiments, the second ejection-push portion 1232 may be configured as a door-opening ejection-push portion, and the first ejection-push portion 1231 may be configured as a door-closing ejection-push portion; that is, when the linkage gear 120 rotates in the forward direction, the second ejection-push portion 1232 pushes the drive member 210 toward the door body 920 to push the door rotation member 220 to eject and push the door body 920 to implement door opening. When the linkage gear 120 rotates in the reverse direction, the first ejection-push portion 1231 pushes the drive member 210 away from the door body 920 to push the door rotation member 220 to pull the door body 920 to implement door closing.

In some embodiments, during a door opening process, in order to meet a timing control of first implementing a door-ejection operation and then implementing a door-rotation operation, a spacing between the first ejection-push portion 1231 and the second ejection-push portion 1232 can be designed to match the timing control. That is, a deflection space can be left between the first ejection-push portion 1231 and the second ejection-push portion 1232, and when the drive member 210 deflects relative to the body, the drive member 210 needs to rotate from the first ejection-push portion 1231 to the second ejection-push portion 1232 by a first angle, and thus a time difference between a deflection of the linkage gear 120 and a deflection of the drive member 210 which is pushed is enabled by setting an initial position of the drive member 210. Therefore during a door opening process, when the linkage gear 120 rotates and drives the door ejection mechanism 300 to implement an ejecting and pushing operation, the door rotation mechanism 200 does not implement an active door-rotation operation at the same time, but is delayed for a period of time and then implements, under the driving of the linkage gear 120, the active door-rotation operation.

In some embodiments, a position in which the drive member 210 abuts against the first ejection-push portion 1231 may be configured as an initial position of the drive member 210, and thus during the door opening process, after the linkage gear 120 starts to rotate, the drive member 210 gradually approaches the second ejection-push portion 1232 from the first ejection-push portion 1231, thereby being capable of accurately controlling a time for the second ejection-push portion 1232 to eject and push the drive member 210, and the door rotation mechanism 200 and the door ejection mechanism 300 are seamlessly connected, a smooth door opening is achieved, and poor matching defects such as jamming and vibration are avoided.

A deflection angle of the drive member 210 can be set according to a designed opening degree of the door body 920 to meet door-rotation requirements. The deflection angle of the drive member 210 is correspondingly controlled as a first angle. A value of the first angle is also related to an initial position and length of the drive member 210 and so on, and can be adjusted and set according to actual assembly conditions.

Referring to FIG. 4, in some embodiments, in order to improve a rotation control precision and reliability of the drive member 210, the body and the first end of the drive member 210 may be coaxially and rotatably disposed on the base 600, to enable a control of angle of the drive member 210 by controlling a rotation angle of the body, and thus a convenience is greatly improved. In other embodiments, the first end of the drive member 210 may not be coaxially disposed with the body, and the drive member 210 may just be pivotally connected to the body of the linkage gear 120 to form a crankshaft drive-like structure. The drive member 210 may also be rotationally disposed on the base, and two push arms may be simultaneously extended and the two push arms may be provided with the first ejection-push portion 1231 and the second ejection-push portion 1232, and the drive member 210 may be disposed between the two push arms, and thus an ejecting and pushing operation can be realized. Positions, and dimensions of components of the above structures may be determined according to experiments to meet requirements of cooperations.

Figure 7:
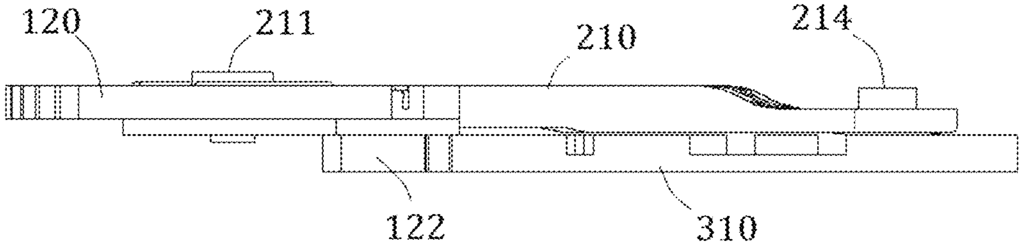
FIG. 7 is a front view for an assembly state of the drive member and the linkage gear of the door opening and closing device in FIG. 1.
Figure 8:
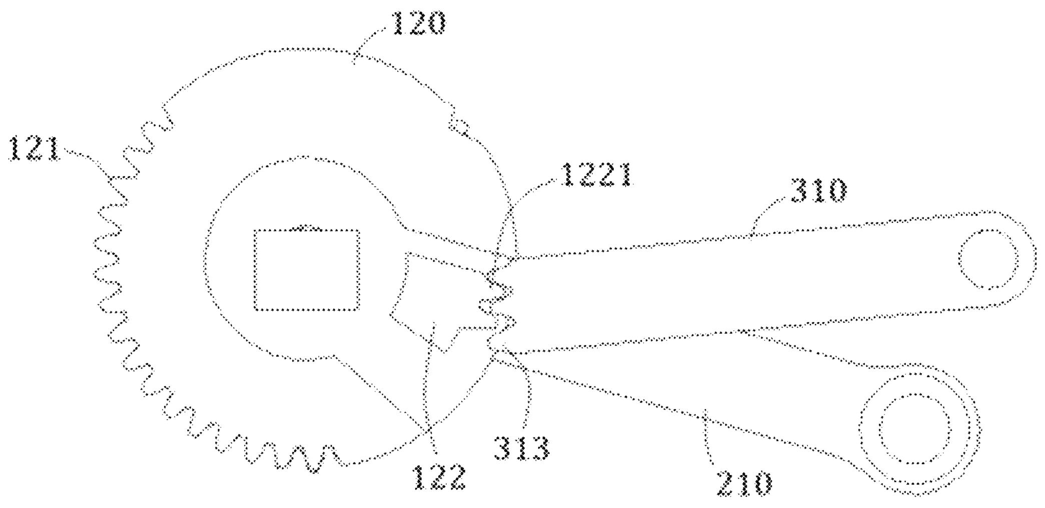
FIG. 8 is a bottom view for an assembly state of a linkage member and a linkage gear of the door opening and closing device in FIG. 1.

Referring to FIG. 7 and FIG. 8, in some embodiments, in order to drive the door ejection mechanism 300, the body of the linkage gear 120 is provided with a third ejection-push portion 122 for connecting to and driving the door ejection mechanism 300. During a door-opening operation, the body of the linkage gear 120 rotates in the forward direction and drives the door ejection mechanism 300 to push the door body 920. Relatively, during a door-closing operation, the body of the linkage gear 120 rotates in the reverse direction to drive the door ejection mechanism 300 to be reset.

In some embodiments, a door-ejection operation only needs to break through the door opening resistances mainly composed of the adsorption force between the door body 920 and the box body 910, and ejects the door body 920 to open by a small angle, and thus an ejecting and pushing stroke of the door ejection mechanism 300 is also small. Accordingly, a connection of the linkage gear 120 to the door ejection mechanism 300 and a stroke and time for ejecting and pushing the door ejection mechanism 300 may also be set according to a relatively short door ejection process, that is, after the door rotation mechanism 200 actively performs a door-rotation operation, the door ejection mechanism 300 and the linkage gear 120 can be disconnected or can be disconnected after a short period of time, to simplify a structural linkage state under a working state and avoiding a mutual interference.

Referring to FIG. 8, in order to improve an accuracy and reliability of a time control of connection and disconnection, a first tooth portion 313 may be disposed on the door ejection mechanism 300. The third ejection-push portion 122 is provided with a second tooth portion 1221 which meshes with the first tooth portion 313 for transmission. Therefore, a stable drive can be achieved by a way of meshing transmission. Meanwhile, an ejecting and pushing stroke may be adjusted by controlling a length and number of teeth for meshing. During the door opening process, the linkage gear 120 rotates in the forward direction, that is, the linkage gear 120 drives the door ejection mechanism 300 to eject and push the door body 920 through the way of meshing transmission until the second tooth portion 1221 and the first tooth portion 313 is disengaged, and the door ejection mechanism 300 will no longer be subjected to a force. During the door closing process, the linkage gear 120 rotates in the reverse direction, and when the linkage gear 120 rotates to a set angle, a meshing connection between the first tooth portion 313 and the second tooth portion 1221 is re-established, and then the door ejection mechanism 300, under the driving of the linkage gear 120, moves in a direction reverse to a direction along which the door is ejected, until the door ejection mechanism 300 is reset.

In some embodiments, a control of door ejection stroke of the door ejection mechanism 300 may be achieved based on a deflection control of the drive member 210. An angle by which the linkage gear 120 rotates during a period from when the first tooth portion 313 and the second tooth portion 1221 begin to mesh to when the first tooth portion 313 and the second tooth portion 1221 separate may be set as a second angle. It is considered that the first angle is an angle by which the body of the linkage gear 120 rotates, when the body starts to rotate, relative to the drive member 210, that is, the first angle is an angle by which the body of the linkage gear 120 rotates within a time period during which the door rotation mechanism 200 is delayed to implement a door-rotation operation. Therefore, the first angle can be controlled to be less than or equal to the second angle, that is, a time period of meshing is controlled based on a relationship of the first angle and the second angle, to control a length of the teeth for meshing.

In some embodiments, in order to ensure a smooth connection between a door ejection process and a door rotation process, a difference between the first angle and the second angle can be controlled as being within 1 degree. That is, when the drive member 210 abuts against the second ejection-push portion 1232, the first tooth portion 313 and the second tooth portion 1221 still have a short segment thereof to be maintained in a meshing state, or have a last tooth pair to be maintained in in the meshing state.

Figure 6:
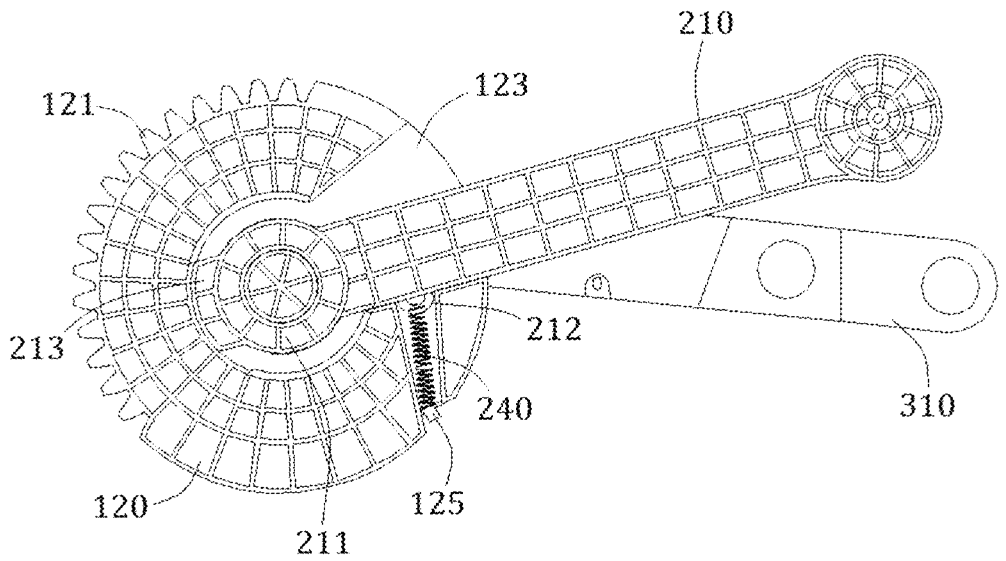
FIG. 6 is a top view of a drive member and a linkage gear of the door opening and closing device in FIG. 1 in an assembly state.

Referring to FIG. 5 and FIG. 6, in some embodiments, in order to smoothly control a deflection posture of the drive member 210, a rotation limit groove 123 may be opened at the body of the linkage gear 120. The body of the linkage gear 120 and the drive member 210 are kept to be coaxially rotatably disposed on the base 600. A coaxial rotation shaft 211 may be disposed in the rotation limit groove 123. The drive member 210 may be rotatably disposed in the rotation limit groove 123. The first ejection-push portion 1231 and the second ejection-push portion 1232 are configured as groove walls of the rotation limit groove 123 in a radial direction of the linkage gear 120, that is, the rotation limit groove 123 is configured as a fan-shaped groove. The rotation limit groove 123 accommodates the drive member 210, to reduce an overall assembly height. At the same time, a sinking groove structure can also effectively protect the drive member 210, and improve an impact and vibration resistance of an ejecting and pushing area, and thus a reliability of the rotation limit groove 123 is ensured.

Figure 2:
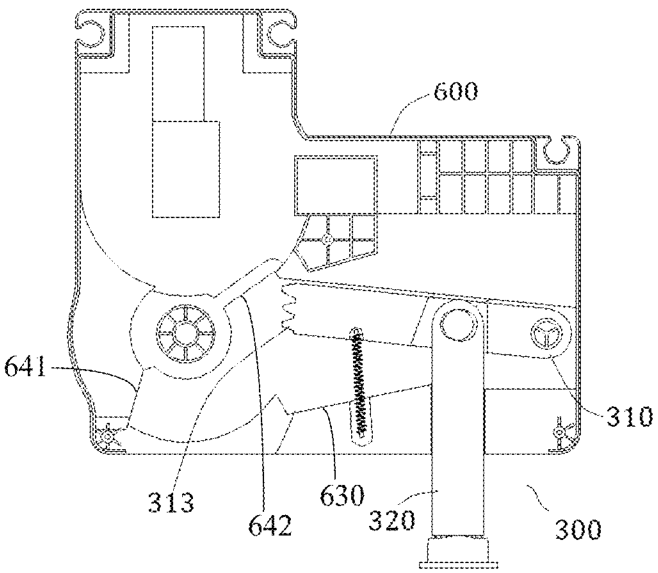
FIG. 2 is a schematic structural diagram of a door ejection mechanism of the door opening and closing device.

Referring to FIG. 1, FIG. 2 and FIG. 6, in some embodiments, in order to ensure that a position at which the drive member 210 abuts against the first ejection-push portion 1231 is an initial position and in order to resist an influence of vibration on a position and posture of the drive member 210, a reset spring 240 can be provided. Two ends of the reset spring 240 are respectively connected to the body of the linkage gear 120 and the drive member 210, to maintain a tension between the drive member 210 and the first ejection-push portion 1231, to form a tendency to approach one another. At the same time, after the door body 920 is opened, the drive member 210 is guided to abut against the second ejection-push portion 1231. In other embodiments, the reset spring 240 may also be replaced with a leaf spring, or other elastic materials, to achieve position limiting by elastic ejecting and pushing, tensioning and so on.

Referring to FIG. 6, in some embodiments, in order to facilitate fixation, a first fix seat 212 may be disposed at the drive member 210 for fixing a first end of the reset spring 240. A second fix seat 125 may also be disposed at the body of the linkage gear 120 to fix a second end of the reset spring 240.

Figure 9:
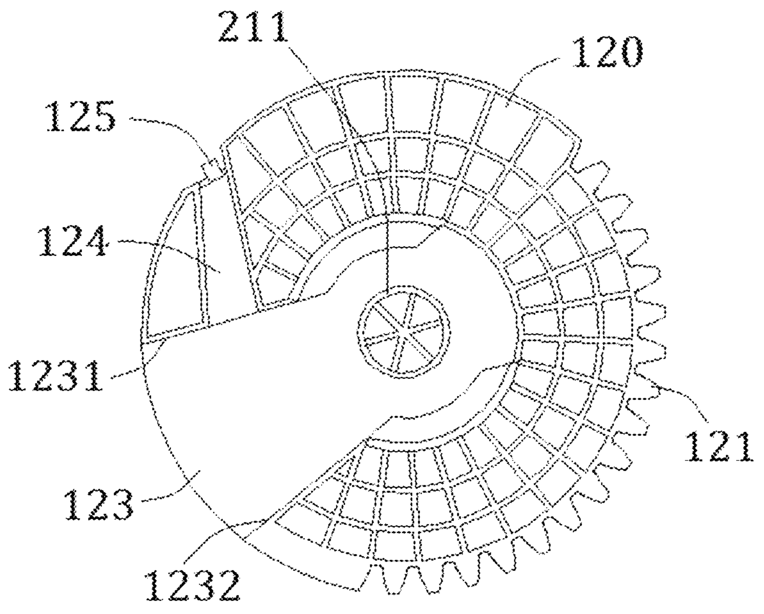
FIG. 9 is a top view of the linkage gear of the door opening and closing device in FIG. 1.
Figure 10:
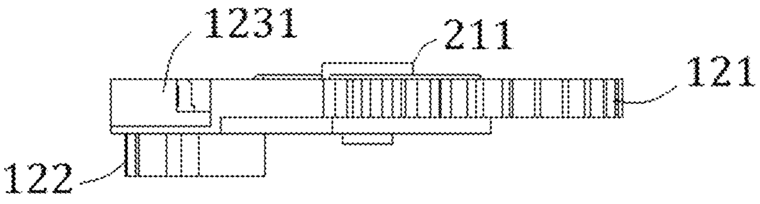
FIG. 10 is a front view of the linkage gear of the door opening and closing device in FIG. 1.

Referring to FIG. 6 and FIG. 9, in consideration of a deformation characteristics of the reset spring 240, a reset-spring accommodation groove 124 is opened at the body of the linkage gear 120. The reset spring 240 can be disposed in the reset-spring accommodation groove 124. Therefore, not only an assembly of the reset spring 240 on the linkage gear 120 is achieved, but also the reset spring 240 is prevented from external impact or scratch, to ensure a stability of deformation state of the reset spring 240. In this embodiment, the reset-spring accommodation groove 124 may also be configured as a fan-shaped groove, with a side close to the rotation limit groove 123 being relatively wider, to adapt to a deflection process of the drive member 210 and avoiding the reset spring 240 from deformation due to resisting and bending.

In some embodiments, the drive member 210 and the door rotation member 220 may be configured to be rod-shaped, to be compatible for a small-sized and high-strength door rotation structure.

In some embodiments, the drive member 210 and the door rotation member 220 may be configured to be plate-shaped, and in a condition that the drive member 210 and the door rotation member 220 are stacked, an installation height can be greatly reduced.

Referring to FIG. 7, in some embodiments, pivoting portions of the drive member 210 and the door rotation member 220 may be respectively configured to have a reduced thickness, and an overall thickness and height of the pivoting portions of the drive member 210 and the door rotation member 220 when pivoting in a superimposed state are reduced. Pivoting portions of the drive member 210 and the door rotation member 220 may also be configured as a pivot shaft 214 which is rotatably disposed at a lower plate-like member to support an upper plate-like member to form a stable and reliable pivot structure. In other embodiments, an end of one of the drive member 210 and the door rotation member 220 may be configured as a U-shaped pivot seat, and an end of another one of the drive member 210 and the door rotation member 220 may be embedded in the U-shaped pivot seat and fixed by the pivot shaft 214.

In some embodiments, in order to improve a functional stability and positioning reliability of the linkage gear 120, a third stop member 641 and a fourth stop member 642 may be disposed on the base 600, and are respectively disposed at the two ends of a rotation trajectory of the linkage gear 120 to prevent excessive rotation of the linkage gear 120 and ensure positioning accuracies of a forward rotation and a reverse rotation. When the door body 920 is closed, the third stop member 641 stops the linkage gear 120 from revolving. When the door body 642 is opened to a limited position, the fourth stop member 642 stops the linkage gear 120 from revolving.

In some embodiments, a limit rotation angle of the linkage gear 120 may be determined according to a designed opening degree of the door body 920. A rotation angle of the linkage gear 120 between the third stop member 641 and the fourth stop member 642 may be set to be to be 90 to 130 degrees.

Referring to FIG. 6, in some embodiments, in order to ensure a balanced posture of the drive member 210, an extension limit portion 213 may be disposed at an end of the drive member 210. The extension limit portion 213 abuts against the base 600 to avoid a side of the drive member 210 from cocking up. In other embodiments, a self-lubricating material layer may be further disposed on the extension limit portion 213 to reduce a contact friction coefficient.

Figure 11:
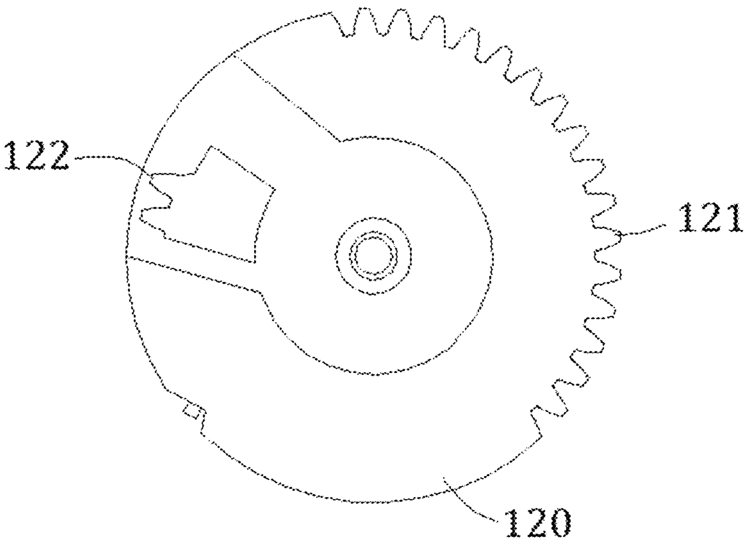
FIG. 11 is a bottom view of the linkage gear of the door opening and closing device in FIG. 1.

Referring to FIG. 1, FIG. 4 and FIG. 11, in some embodiments, in order to improve a position control accuracy of the drive member 210 and prevent the drive member 210 from being out of position, a second stop member 620 may be disposed on the base 600 to prevent the drive member 210 from being excessively deflected. The second stop member 620 may be disposed between the second ejection-push portion 1232 and the first ejection-push portion 1231. A position in which the drive member 210 abuts against the first ejection-push portion 1231 may be configured as an initial position of the drive member 210, to limit the drive member 210 between the second stop member 620 and the first ejection-push portion 1231 to ensure a reliability of the initial position of the drive member 210. A position of the second stop member 620 may be configured according to a width and a preset initial position of the drive member 210, with reference to an initial position of the first ejection-push portion 1231, and with a distance between the second stop member 620 and the first ejection-push portion 1231 being slightly larger than a width of the drive member 210 as a standard.

In some embodiments, a stop surface 621 matching a profile of a side wall of the drive member 210 may be disposed on the second stop member 620 to ensure uniform force subjected by the drive member 210 in a stopped state and avoid a local force concentration that may cause structural damage.

Referring to FIG. 2, in some embodiments, the door ejection mechanism 300 includes a linkage member 310 and a door ejection member 320. The linkage member 310 is connected to the drive mechanism 100 for obtaining the driving force. The linkage member 310 can move under the driving of the drive mechanism 100. The door ejection member 320 is configured to eject and push the door body 920 to rotate. The door ejection member 320 is connected to the linkage member 310, and a door-ejection operation and a reset are implemented under the driving of the linkage member 310.

Referring to FIG. 2, in some embodiments, the linkage member 310 is rotatably disposed on the base 600, and thus can deflect around a rotation axis under the driving of the drive mechanism 100. The door ejection member 320 is rotatably connected to the linkage member 310, and thus can move along an arc trajectory with the linkage member 310, and continues to eject and push the door body 920 after abutting against the door body 920. A deflection structure of the linkage member 310 can reduce a front pressure on the door ejection mechanism 300 to a certain extent while an ejecting and pushing effect is also ensured, to ensure a structural stability and service life and improving a reliability of door-ejection operation.

Figure 3:
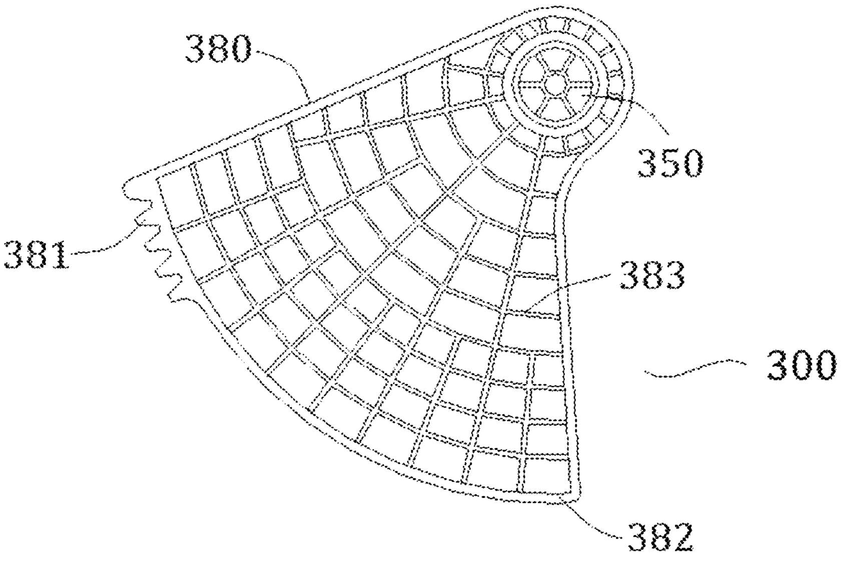
FIG. 3 is another schematic structural diagram of the door ejection mechanism of the door opening and closing device in FIG. 1.

Referring to FIG. 3, the door ejection mechanism 300 may also be a structure which is different from the above structure, and may be configured as a door ejection profile 380. The door ejection profile 380 may be rotatably disposed on the base 600 via a linkage-member pivot shaft 350. Areas of the door ejection profile 380 may be divided according to functions thereof, that is, a fourth tooth portion 381 for meshing and connecting the drive mechanism 100 is provided. The door ejection profile 380, under the driving of the drive mechanism 100, is driven to rotate. A door ejection portion 382 may be disposed on the door ejection profile 380. The door ejection portion 382, when revolving with the linkage gear 120, ejects and pushes the door body 920 until the door body 920 is pushed to open to a degree.

Referring to FIG. 3, the door ejection profile 380 is a fan-shaped structural member. The door ejection portion 382 is a corner portion of an end of the fan-shaped structural member. The door ejection profile 380, when rotating, ejects and pushes the door body 920 along an arc trajectory. In other embodiments, the door ejection profile 380 may be configured as a shape of a cam, and the first tooth portion 381 and the door ejection portion 382 may be disposed on a rim of the cam.

Figure 18:
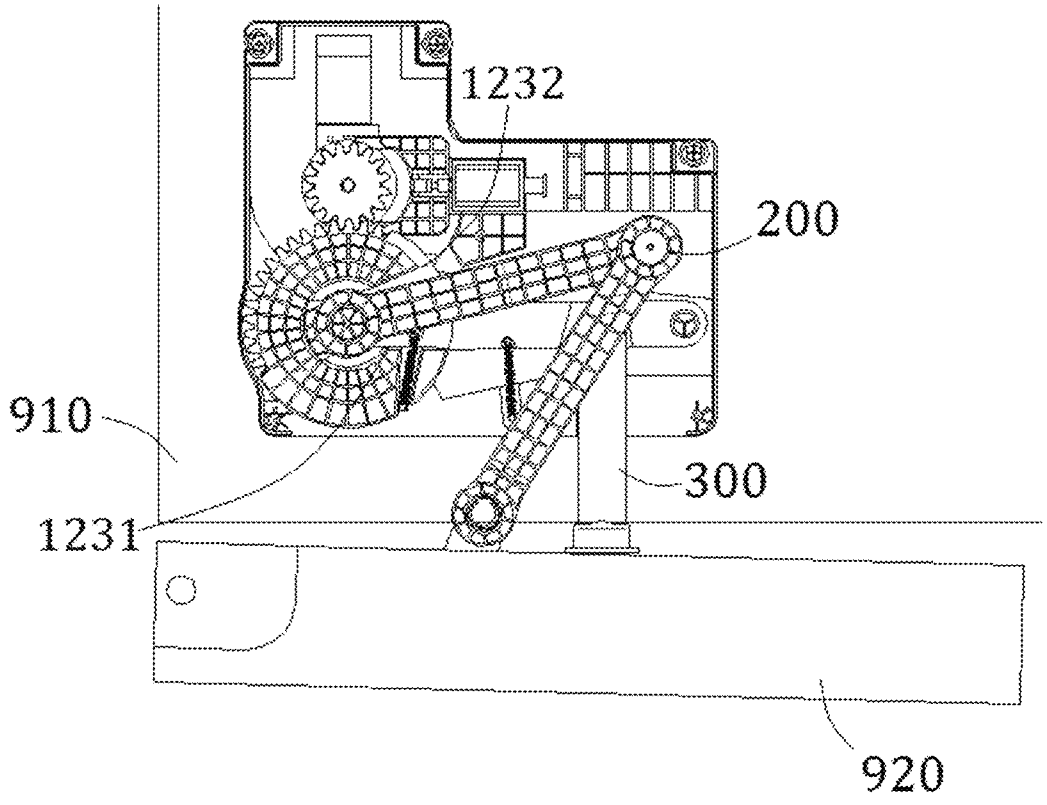
FIG. 18 is a schematic diagram of the door opening and closing device in FIG. 1 in a door ejection state.
Figure 19:
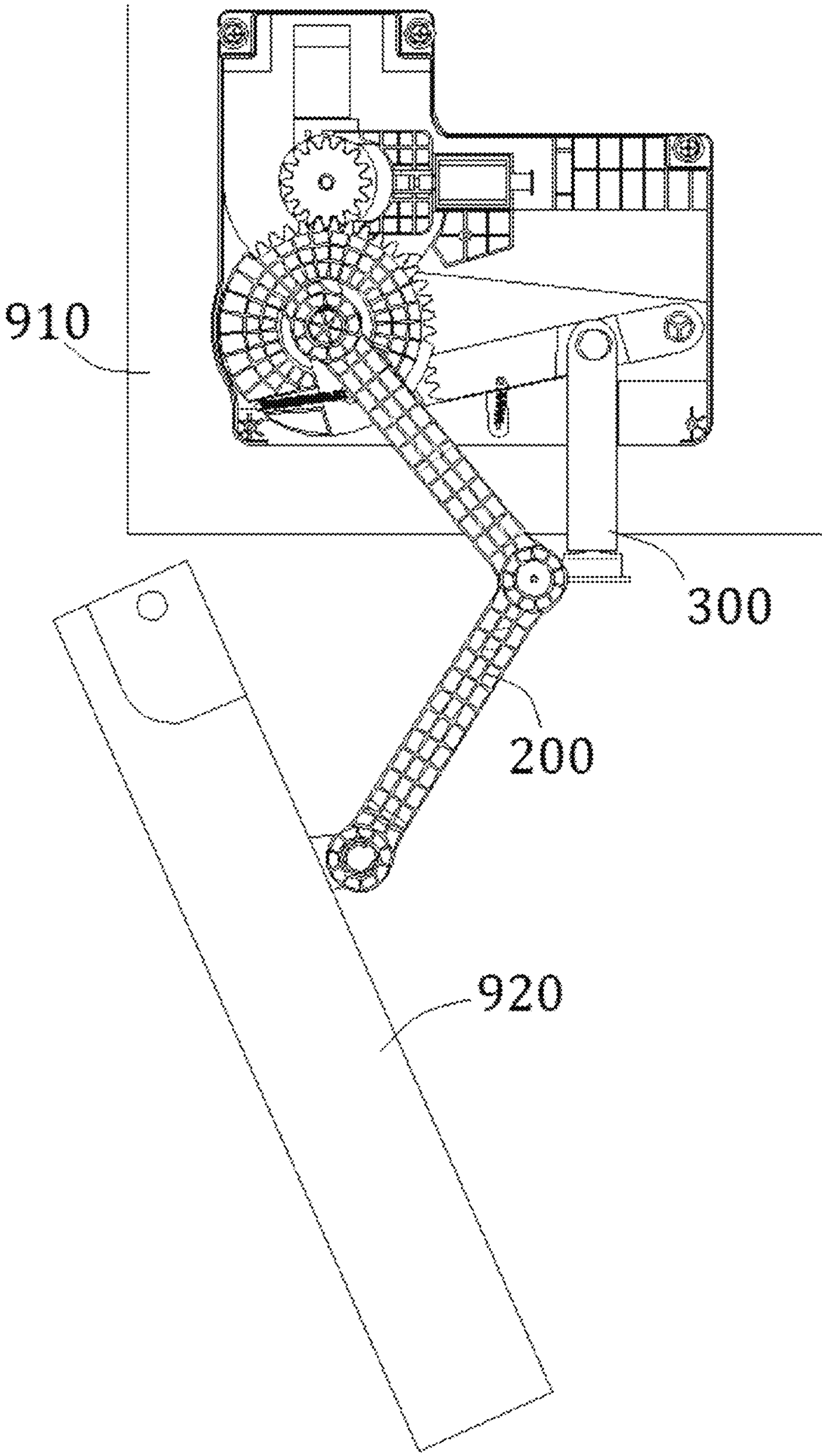
FIG. 19 is a schematic diagram of the door opening and closing device in FIG. 1 in a state of door opening and door rotation.
Figure 20:
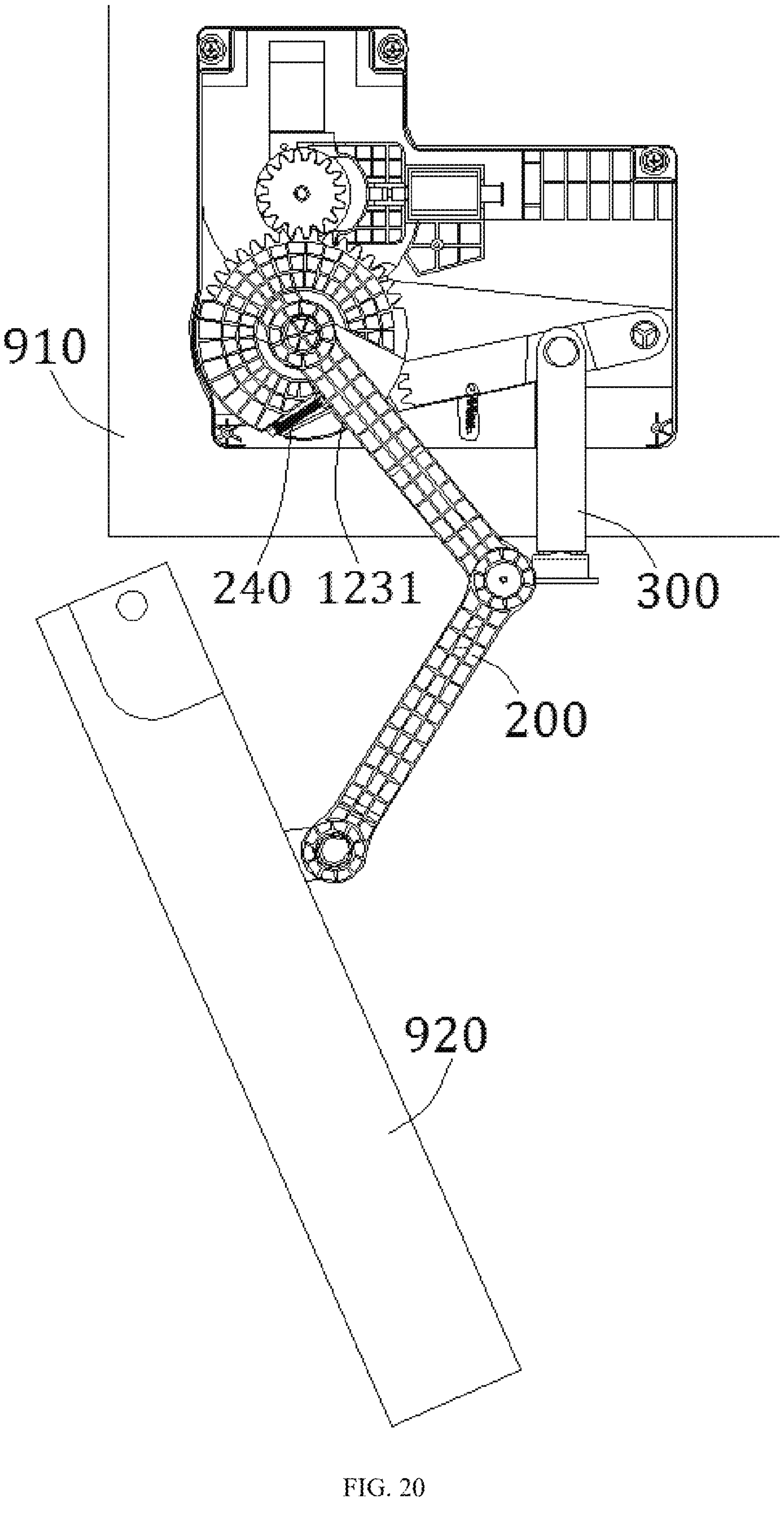
FIG. 20 is a schematic diagram of the door opening and closing device in FIG. 1 in a state of door closing and door rotation.

Referring to FIG. 18, FIG. 19 and FIG. 20, in some embodiments, when the door opening and closing device performs a door-opening operation, the drive mechanism 100 drives the linkage gear 120 to rotate in the forward direction relative to the base 600, to drive the door ejection mechanism 300 to eject and push the door body 920. At the same time, as the linkage gear 120 continues to rotate in the forward direction, the drive member 210 and the second ejection-push portion 1232 approach each other. When the drive member 210 abuts against the second ejection-push portion 1232, the drive member 210 follows the linkage gear 120 to rotate in the forward directions under an ejecting and pushing of the second ejection-push portion 1232 to approach the door body 920, to eject and push the door rotation member 220 to rotate relative to the door body 920 and eject and push the door body 920. When or before the door ejection mechanism 300 ejects the door body 920 to open to a preset opening degree, the drive member 210 and the door rotation member 220 continue to rotate with the linkage gear 20 and quickly rotate the door body 920 until a set opening degree is reached, and thus the door-opening operation is completed.

When a door-closing operation is performed, the drive mechanism 100 drives the linkage gear 120 to rotate in the reverse direction relative to the base 600, and the drive member 210 follows the linkage gear 120 to rotate in the reverse direction under an ejecting and pushing of the first ejection-push portion 1231, and pulls the door body 920 to deflect toward the box body 910 until the box body 910 is closed, and thus the door-closing operation is completed. During the door-closing operation, the door ejection mechanism 300 follows the linkage gear 120 to rotate until the door ejection mechanism 300 is reset.

Referring to FIG. 1, in some embodiments, the door opening and closing device is further provided with a clutch device which is configured for detachably connecting the drive mechanism 100 to the door rotation mechanism 200 and the door ejection mechanism 300 to realize a stable and smooth transmission of a driving torque. The clutch device is enable to flexibly disconnect the door rotation mechanism 200 and the door ejection mechanism 300 from the drive mechanism 100, to avoid an interference from the drive mechanism 100 during manual door opening and closing operations, and is enable to flexibly disconnect the door rotation mechanism 200 and the door ejection mechanism 300 from the drive mechanism 100 in an event of device failure or environmental interference, to ensure a safety of device structure and avoiding mechanical damage. In some embodiments, the clutch device may not be provided, and may be configured as required, which will not be described in detail here.

Figure 12:
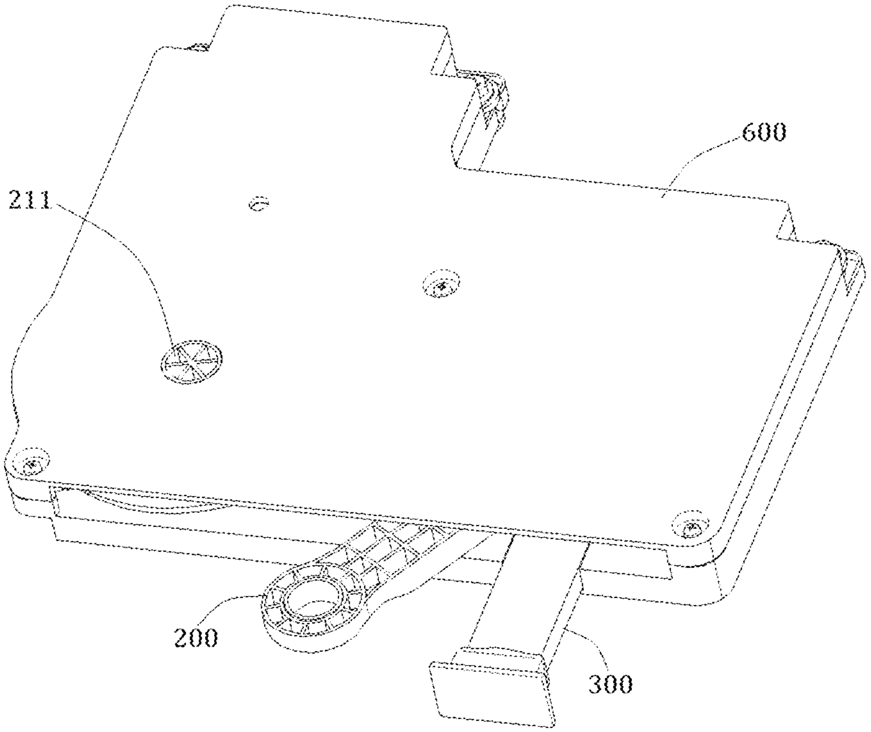
FIG. 12 is a schematic diagram for an assembly state of the door opening and closing device in FIG. 1.
Figure 13:
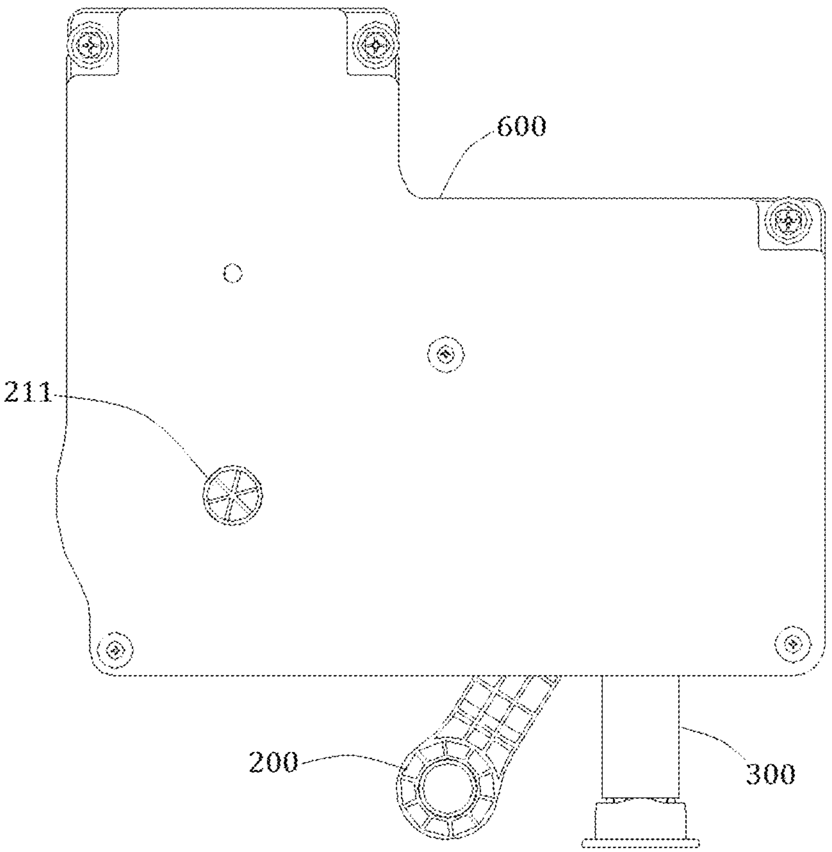
FIG. 13 is a top view for an assembly state of the door opening and closing device in FIG. 1.
Figure 14:
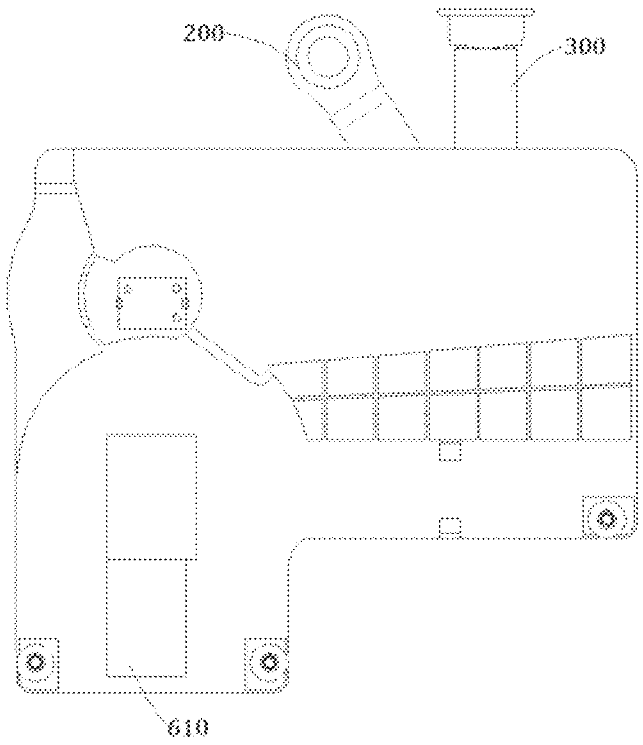
FIG. 14 is a bottom view for an assembly state of the door opening and closing device in FIG. 1.

Referring to FIG. 12, FIG. 13 and FIG. 14, in some embodiments, the base 600 is configured to be assembled by two independent housings that are matched and snap-fitted together, and fasteners such as fastening screws may be correspondingly provided for locking. A window may be opened in areas where the door ejection member 320 or the door ejection profile 380, the door rotation member 220 and the drive member 210 pass by, to facilitate extensions of the door ejection member 320 or the door ejection profile 380, the door rotation member 220 and the drive member 210, and thus a smooth execution of door opening and closing operations is ensured, while orderly storage can be achieved and an internal functional structure can be protected.

In some embodiments, a shaft reinforcement fixing structure may be provided corresponding to positions of the coaxial rotation shaft 211 and the linkage-member pivot shaft 350 to ensure a reliability of a pivot structure.

Figure 15:
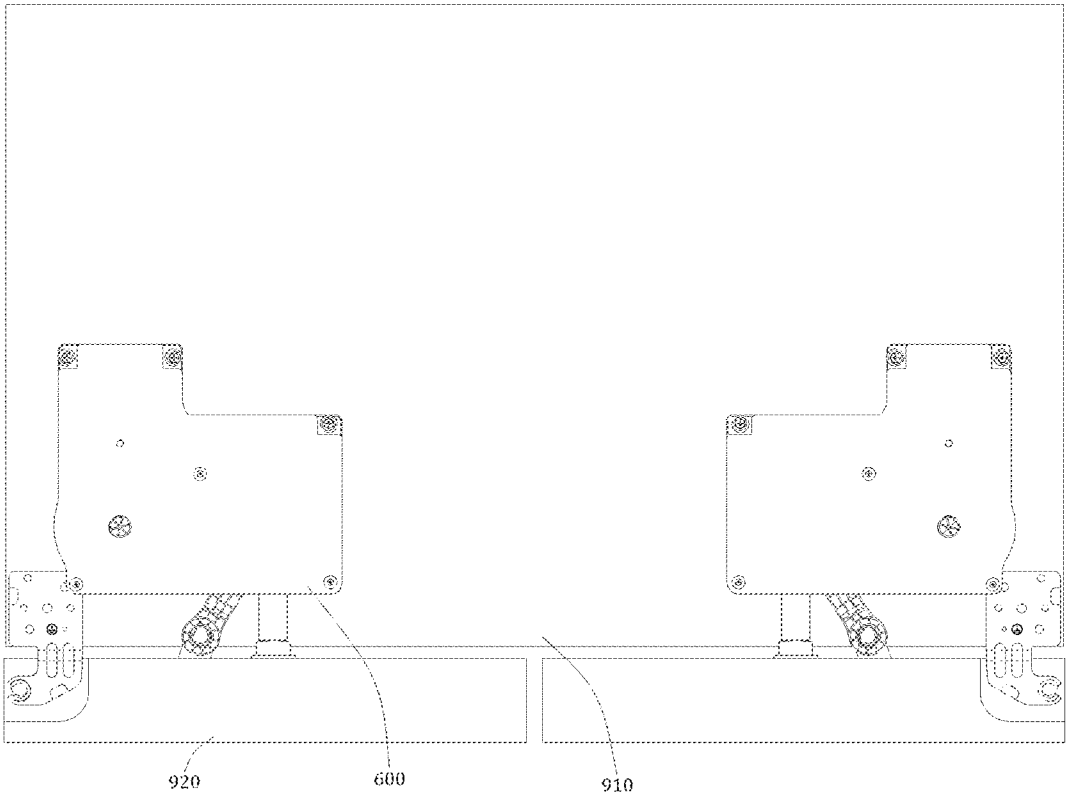
FIG. 15 is a top view for an assembly arrangement in a refrigerator of the door opening and closing device in FIG. 1.
Figure 16:
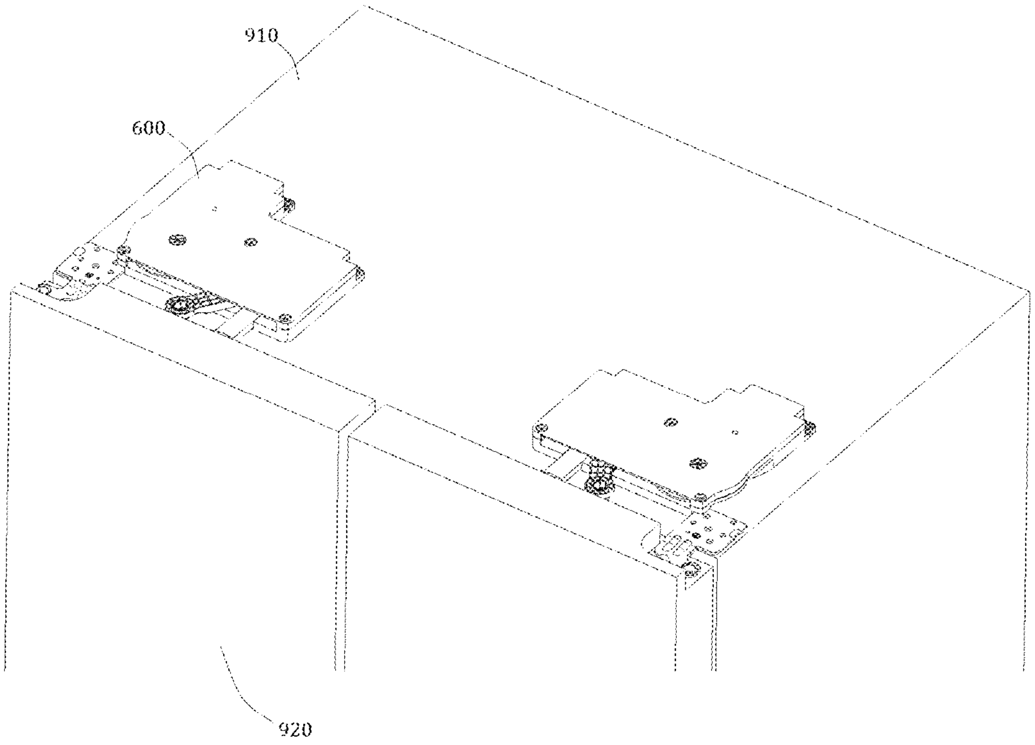
FIG. 16 is a local structural schematic diagram for an assembly arrangement in a refrigerator of the door opening and closing device in FIG. 1.
Figure 17:
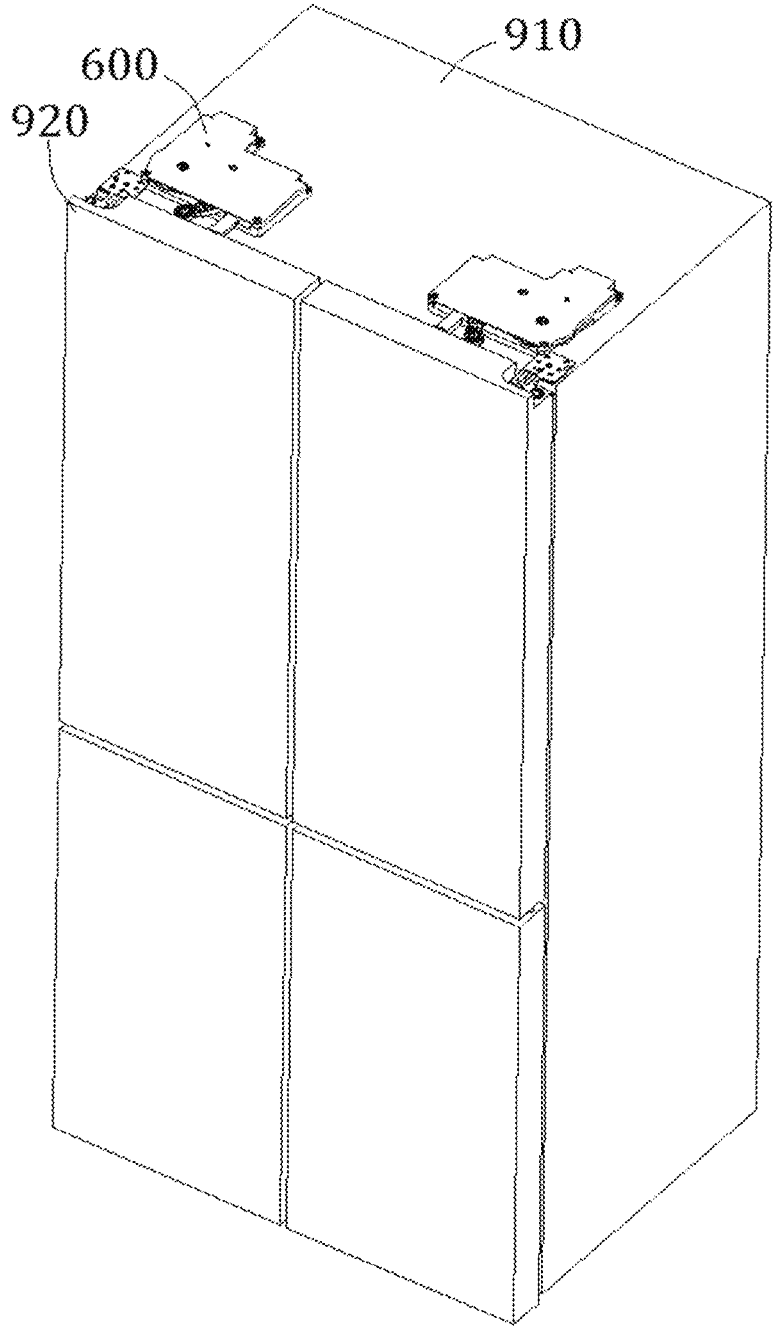
FIG. 17 is a schematic diagram for an assembly arrangement in a refrigerator of the door opening and closing device in FIG. 1.

Referring to FIG. 15, FIG. 16 and FIG. 17, in some embodiments, a refrigerator is further provided. The refrigerator is the above-mentioned electrical apparatus. The refrigerator includes a box body 910 and a door body 920, and the door body 910 is rotatably disposed on the box body 910. A door opening and closing device is connected between the box body 910 and the door body 920 to eject and push or deflect the door body 920 relative to the box body 910, to realize the door opening and closing operations.

Referring to FIG. 15, FIG. 16 and FIG. 17, in some embodiments, the door opening and closing device is provided with a base 600 which is fixed at the box body 910. The door ejection member 320 or the door ejection profile 380 is directed to or pressed against the door body 920. The door rotation member 220 is hinged on the door body 920 through the hinge seat 230. In other embodiments, the base 600 may be an integrated surface structure formed at a top of the box body 910 to serve as the base. In some other embodiments, the base 600 may also be disposed on the door body 920. The door ejection member 320 or the door ejection profile 380 is directed to or is pressed against the box body 910. The door rotation member 220 is hinged to the box body 910 via the hinge seat 230.

Referring to FIG. 15, FIG. 16 and FIG. 17, in some embodiments, the refrigerator may be provided with door bodies 920. Independent door opening and closing devices may be provided corresponding to each door body 920, to realize an automatic door opening and closing functionality of the multi-door body refrigerator.

With a door opening and closing device and an electrical apparatus according to some embodiments of the disclosure, automatic door-ejection operation and door rotation operation are realized respectively through a door ejection mechanism and a door rotation mechanism driven by a drive mechanism, and thus a convenience and safety of door-opening operation are improved. The door body can be ejected and pushed by the door ejection mechanism, to accumulate force to break through a door opening resistance to eject the door open to a set angle, to reduce a resistance of subsequently revolving the door of the door rotation mechanism and increasing a speed for automatically opening the door. The drive member rotatably disposed on the base can serve as a pushing arm, which is driven by the drive mechanism to eject and push the door body through a lever principle, to greatly improve an ejecting and pushing efficiency in a door-rotation stage. The door rotation member can be rotatably connected to the drive member and the door body, and thus the door rotation member can adapt to a deflection posture change of the linkage member by deflecting relative to the drive member and the door body, and the door rotation member can always be stably hinged on the door body to improve a pushing and pulling effect during a door rotation process.

Although some embodiments of the disclosure have been described, additional changes and modifications may be made to these embodiments. Therefore, it is intended that the appended claims be interpreted as including the embodiment as well as all changes and modifications that fall within the scope sought for by the disclosure.

Various changes and modifications to the disclosure without departing from the spirit and scope of the disclosure. Thus, if these modifications and variations of the disclosure fall within the scope of the claims of the disclosure and the equivalent technologies thereof, the disclosure is also intended to include these modifications and variations.

What is claimed is:

1. A door opening and closing device, comprising:

a door ejection mechanism and a door rotation mechanism which are driven by a same drive mechanism;

the door rotation mechanism comprises a drive member and a door rotation member; a first end of the door rotation member is rotatably disposed on a door body; and a second end of the door rotation member is rotatably connected to a first end of the drive member; and a second end of the drive member is rotatably disposed on a base; and the drive mechanism comprises a linkage gear; the linkage gear drives the drive member to rotate so as to drive the door rotation member to rotate the door body, and drive the door ejection mechanism to eject and push the door body;

wherein the door ejection mechanism is rotatably disposed on the base, and comprises a first tooth portion meshing with the linkage gear and a door ejection portion for ejecting and pushing the door body;

wherein the linkage gear drives, by the first tooth portion, the door ejection mechanism to rotate relative to the base, so as to drive the door ejection portion to eject and push the door body;

wherein the drive member and the door rotation member are rod-shaped.

2. The door opening and closing device according to claim 1, wherein the linkage gear comprises:

a body, rotatably disposed on the base;

a first ejection-push portion, disposed on the body and ejecting and pushing the drive member to rotate when the body rotates in a forward direction, and driving, by the drive member, the door rotation member to rotate so as to open the door body; and a second ejection-push portion, disposed on the body and ejecting and pushing the drive member to rotate when the body rotates in a reverse direction, and driving, by the drive member, the door rotation member to rotate so as to close the door body.

3. The door opening and closing device according to claim 2, wherein the drive member rotates between the first ejection-push portion and the second ejection-push portion by a first angle; and the body and the drive are coaxially rotatably disposed on the base.

4. The door opening and closing device according to claim 3, wherein the linkage gear further comprises a third ejection-push portion, the third ejection-push portion driving the door ejection mechanism to push the door body when the body rotates in the forward direction.

5. The door opening and closing device according to claim 4, wherein the door ejection mechanism comprises a first tooth portion; and the third ejection-push portion is provided with a second tooth portion meshing with the first tooth portion for transmission.

6. The door opening and closing device according to claim 5, wherein the first angle is less than or equal to a second angle, wherein the second angle is an angle by which the linkage gear rotates from a time when the first tooth portion begins to mesh with the second tooth portion to a time when the first tooth portion is separated from the second tooth portion.

7. The door opening and closing device according to claim 6, wherein a difference between the first angle and the second angle is less than or equal to 1 degree.

8. The door opening and closing device according to claim 2, wherein a rotation limit groove is disposed at the body; the body and the drive member are coaxially rotatably disposed on the base; the drive member is rotatable in the rotation limit groove; and the first ejection-push portion and the second ejection-push portion are groove walls of the rotation limit groove in a radial direction of the linkage gear.

9. The door opening and closing device according to claim 2, wherein the door rotation mechanism further comprises:

a reset spring, two ends of which are respectively connected to the body and the drive member, to pull the drive member to abut against the second ejection-push portion after the door body is opened.

10. The door opening and closing device according to claim 1, wherein the drive member and the linkage gear are coaxially rotatably disposed on the base.

11. The door opening and closing device according to claim 1, wherein a third stop member and a fourth stop member are disposed on the base; when the door body is closed, the third stop member stops the linkage gear from revolving; and when the door body is completely opened, the fourth stop member stops the linkage gear from revolving.

12. The door opening and closing device according to claim 11, wherein a rotation angle of the linkage gear between the third stop member and the fourth stop member is less than 130 degrees.

13. The door opening and closing device according to claim 1, wherein the door ejection mechanism further comprises:

a limit member, disposed on the base, wherein the door ejection mechanism abuts against the limit member when the door ejection mechanism rotates to a preset angle relative to the base; and a tensioning member, two ends of which are respectively connected to the door ejection mechanism and the base to maintain the door ejection mechanism at the preset angle.

14. The door opening and closing device according to claim 1, wherein the door ejection mechanism is in a shape of a cam; and the first tooth portion and the door ejection portion are located at a rim of the cam.

15. An electrical apparatus, comprising: a box body, a door body rotatably disposed on the box body, and a door opening and closing device, comprising:

a door ejection mechanism and a door rotation mechanism which are driven by a same drive mechanism;

the door rotation mechanism comprises a drive member and a door rotation member; a first end of the door rotation member is rotatably disposed on a door body; and a second end of the door rotation member is rotatably connected to a first end of the drive member; and a second end of the drive member is rotatably disposed on a base; and the drive mechanism comprises a linkage gear; the linkage gear drives the drive member to rotate so as to drive the door rotation member to rotate the door body, and drive the door ejection mechanism to eject and push the door body, wherein the base is disposed on the box body;

wherein the door ejection mechanism is rotatably disposed on the base, and comprises a first tooth portion meshing with the linkage gear and a door ejection portion for ejecting and pushing the door body;

wherein the linkage gear drives, by the first tooth portion, the door ejection mechanism to rotate relative to the base, so as to drive the door ejection portion to eject and push the door body;

wherein the drive member and the door rotation member are rod-shaped.

16. The electrical apparatus according to claim 15, wherein the electrical apparatus is one of a refrigerator, a disinfection cabinet, and a dishwasher.

17. The electrical apparatus according to claim 15, wherein the linkage gear comprises:

a body, rotatably disposed on the base;

a first ejection-push portion, disposed on the body and ejecting and pushing the drive member to rotate when the body rotates in a forward direction, and driving, by the drive member, the door rotation member to rotate so as to open the door body; and a second ejection-push portion, disposed on the body and ejecting and pushing the drive member to rotate when the body rotates in a reverse direction, and driving, by the drive member, the door rotation member to rotate so as to close the door body.

18. The electrical apparatus according to claim 17, wherein the drive member rotates between the first ejection-push portion and the second ejection-push portion by a first angle; and the body and the drive are coaxially rotatably disposed on the base.

* * * * *